(12) United States Patent
Schimmeyer

(10) Patent No.: US 7,712,718 B2
(45) Date of Patent: May 11, 2010

(54) SUPPORT FOR BEVERAGE CONTAINER AND CELL PHONE

(76) Inventor: Werner Schimmeyer, 8937 Acorn Pl., Santa Rosa, CA (US) 95409

( * ) Notice: Subject to any disclaimer, the term of this patent is extended or adjusted under 35 U.S.C. 154(b) by 118 days.

(21) Appl. No.: 11/732,791

(22) Filed: Apr. 4, 2007

(65) Prior Publication Data

US 2008/0245941 A1    Oct. 9, 2008

(51) Int. Cl.
    *A47K 1/08*    (2006.01)
(52) U.S. Cl. .............. 248/311.2; 248/316.7; 220/482; 220/737; 224/926
(58) Field of Classification Search .............. 248/311.2, 248/316.7, 339, 304, 690; 220/482, 737, 220/738, 739; D7/619.1, 620; 224/483, 224/482, 560, 572, 926
    See application file for complete search history.

(56) References Cited

U.S. PATENT DOCUMENTS

| | | | |
|---|---|---|---|
| 2,289,701 A | | 7/1942 | Engel et al. |
| 2,294,151 A | | 8/1942 | Wooten, Jr. et al. |
| D226,623 S | | 4/1973 | Shuford |
| 4,478,052 A | | 10/1984 | McDowell |
| 4,653,289 A | | 3/1987 | Hodgetts |
| 4,852,843 A | * | 8/1989 | Chandler .................. 248/311.2 |
| 4,892,138 A | | 1/1990 | Bibik, Jr. |
| 5,012,654 A | | 5/1991 | Gatti |
| 5,092,395 A | | 3/1992 | Amidzich |
| 5,165,646 A | | 11/1992 | Gewecke |
| D338,138 S | | 8/1993 | Miyajima |
| D342,192 S | | 12/1993 | Yu |
| D342,869 S | | 1/1994 | Fry |
| D342,871 S | | 1/1994 | Stern et al. |
| 5,511,754 A | * | 4/1996 | Johannsen ................ 248/311.2 |
| 5,593,124 A | * | 1/1997 | Wang ..................... 248/231.81 |
| 5,697,587 A | | 12/1997 | Israel |
| D402,666 S | * | 12/1998 | Golder ....................... D14/253 |
| 5,913,452 A | * | 6/1999 | Weigl ......................... 220/737 |
| 5,961,083 A | | 10/1999 | Hartmann et al. |
| 5,979,724 A | * | 11/1999 | Loewenthal et al. ......... 224/483 |
| 6,098,860 A | * | 8/2000 | Phillips ....................... 224/483 |
| 6,155,063 A | | 12/2000 | Felde |
| 6,560,983 B1 | | 5/2003 | Schimmeyer |
| 7,021,825 B1 | * | 4/2006 | Schultz ........................ 383/76 |

* cited by examiner

*Primary Examiner*—A. Joseph Wujciak, III
(74) *Attorney, Agent, or Firm*—Walter A. Hackler

(57) ABSTRACT

A holder for supporting a beverage container against an automobile air conditioner/heater grill includes a housing having a base for holding a beverage container bottom, and open top surrounding the beverage container sides, an open back and upstanding sidewalls inner connecting the base and the open top. Sidewalls include an open front for enabling passage of air therethrough and circulation of air around the container sides. A pair of spaced apart ribs extending vertically between the base and the top across the open back and a slidable element disposed between the ribs enable vertical positioning of the housing in front of the grill. Arms, separate from the housing, are provided for engaging the grill and including an interconnecting portion for removably engaging a slidable/deflecting element.

4 Claims, 2 Drawing Sheets

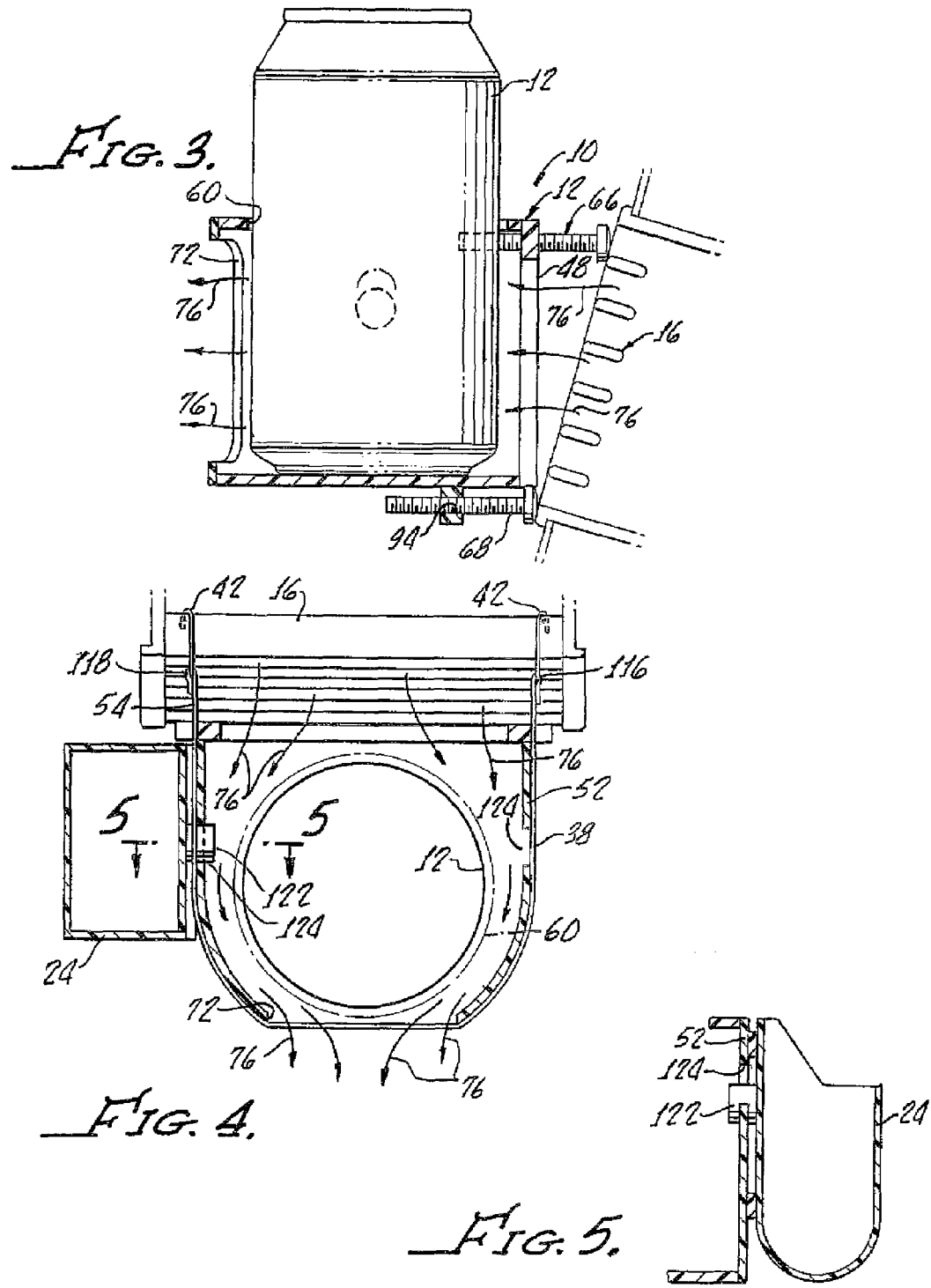

SUPPORT FOR BEVERAGE CONTAINER AND CELL PHONE

The present invention generally relates to a holder for supporting a beverage container for receiving air from an automobile heating and cooling system and more particularly directed to a positionable beverage holder for enabling convenient positioning of the beverage holder with respect to and in front of an automobile dashboard vent for enabling optimal cooling and heating of a beverage container supported by the holder and supporting/holding a cell phone in a convenient location with the automobile.

Beverage holders for mounting on the dashboard or other positions within an automobile are generally well known.

For example, U.S. Pat. No. Des. 226,623, 2,289,701, and 2,294,151 show a holder for a beverage container for use against a door panel or the like. U.S. Des. 338,138 discloses a container holder for securing to the dashboard vent of an automobile as do U.S. Des. 342,192 and U.S. Des. 342,869.

The various beverage holders developed have the common purpose of supporting a beverage container in a stationary position, preferably for receiving heating or cooling from the dashboard, while freeing both hands of the driver and passengers in order to not only to enable safe operation of the automobile, but minimizing the possibility of spillage during vehicle maneuvers. See for example U.S. Pat. No. 6,560,983 to Schimmeyer.

While these designs are useful for providing beverage container support, they do not optimize or facilitate positioning of the beverage holder in front of the dashboard air conditioning/heating vents in order to provide optimum heating and/or cooling of the beverage container supported by the holder.

Heretofore, designed holders required reattachment of the holder to the vent in order to reposition the holder in front of the vent. In this regard, optimum positioning may not be attainable because of discrete positioning of vent ribs that is necessary for coupling the beverage holder to the grill.

Other devices provide for permanently attaching supporting arms to the vent and means for adjusting the position of the beverage holder in front of the vent. However, each of these devices require positioning and coupling of the holder with attached arms in order to effect a proper position. Further, most of these devices enable only discrete positions against the grill, or vent, and this does not optimize the positioning of the holder in front of the dashboard vent.

The present invention provides for a holder for supporting a beverage container that provides for support a beverage container in a general vertical position against a non-vertical grill in an optimal position for heat transfer. Once adjusted, the holder can be removed and replaced in front of the dashboard without separate adjustment as is necessary with prior art devices.

SUMMARY OF THE INVENTION

A holder for supporting a beverage container against an automobile air conditioner/heater grill and also supporting a cell phone, generally includes a housing with a beverage container bottom holding base, an open top surrounding the beverage container sides, an open back and upstanding walls connecting the base of the open top.

The sidewalls include an open front for enabling passage of air therethrough and circulation of air around the container sides.

A plurality of adjustable pins protruding from the housing back and adjustment of the protrusion of the pins from the housing back enable abutment with non-vertical grills with the housing top in a generally horizontal plane and the beverage being held in a generally vertical orientation.

An elastic member encircles the housing sidewalls and front and grill engagement hooks fixed to opposite ends of the elastic member hold the housing firmly against the grill.

A cell phone holder is provided which is detachably received by one of the housing upstanding sidewalls. The sidewalls accordingly include opposing openings which enable detachable engagement of the cell phone holder on opposite sides of the housing.

Preferably, the elastic member passes between the cell phone holder and the housing sidewalls thus enabling easy placement and removal of the cell phone holder.

Because the cell phone holder may be disposed on opposite sides of the housing, a cell phone may be orientated for preferential access by a driver or a passenger.

In order to provide stability, the plurality of adjustable pins may include three adjustable pins which are disposed in a spaced apart triangular relationship on the housing back. Each pin may include a threaded shank received by the corresponding thread of the bores in the housing back which enables adjustment of protrusion and in addition each pin preferably includes a non-slip head portion disposed at a protruding end of each pin to prevent the pin from entering the grill against which it is disposed.

BRIEF DESCRIPTION OF THE DRAWINGS

The advantages and features of the present invention will be better understood by the following description when considered in conjunction with the accompanying drawings, in which:

FIG. 3 is a cross sectional side view of the holder shown in FIG. 1 as it may be installed against an air conditioning grill through the use of adjustable protruding pins;

FIG. 4 is a top view of the holder shown in FIGS. 2 and 3 as it may be installed against an air conditioner grill further showing an elastic member for encircling the housing sidewalls along with grill engagement hooks fixed to opposite ends of the elastic member as well as a cell phone holder detachably received by upstanding housing sidewalls; and FIG. 5 is a side cross sectional view, taken along the line 5-5 of FIG. 4, illustrating removable attachment of the cell phone holder to the housing.

DETAILED DESCRIPTION

Figure 1:
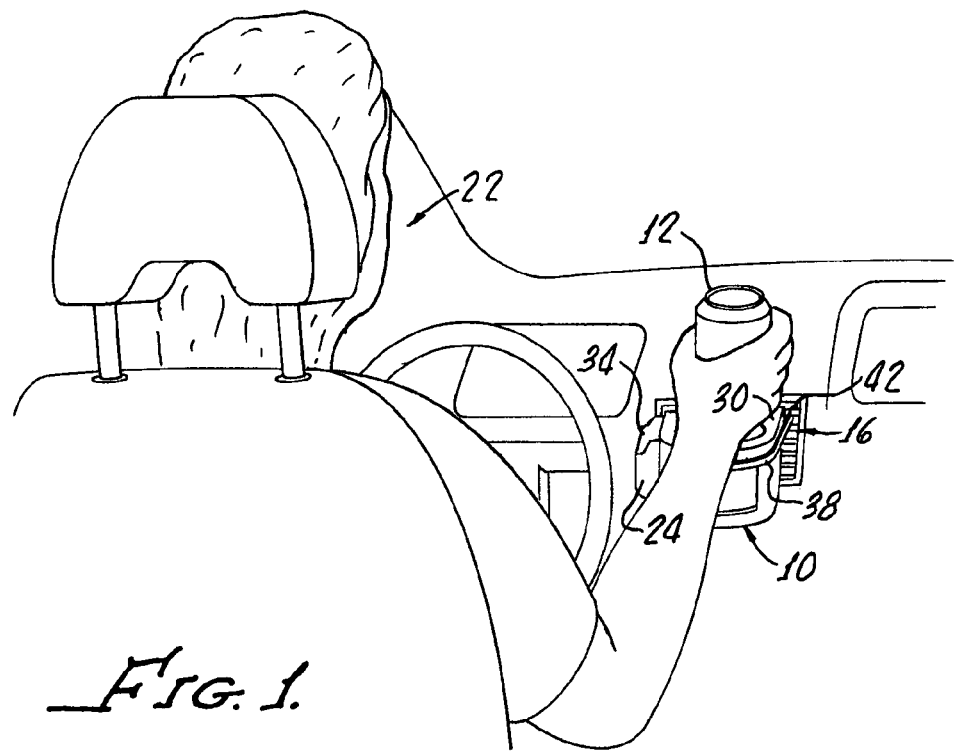
FIG. 1 is a perspective view of the holder in accordance with the present invention as it may be installed against the air conditioning grill of an automobile and also showing in perspective a driver ready access to either the beverage container or a cell phone supported by the holder.

With reference to FIG. 1, there is shown a holder 10 in accordance with the present invention for supporting a beverage container 12 positioned against an automobile air conditioner/heater grill 16 for ready access by a driver 22.

As will be hereinafter described in greater detail, a cell phone holder 24 may be detachably disposed on a holder housing 30 for cradling a cell phone 34 also at a position for convenient access by the driver 22.

An elastic member 38 surrounding the housing engages the grill 16 via grill engagement hooks 42.

Figure 2:
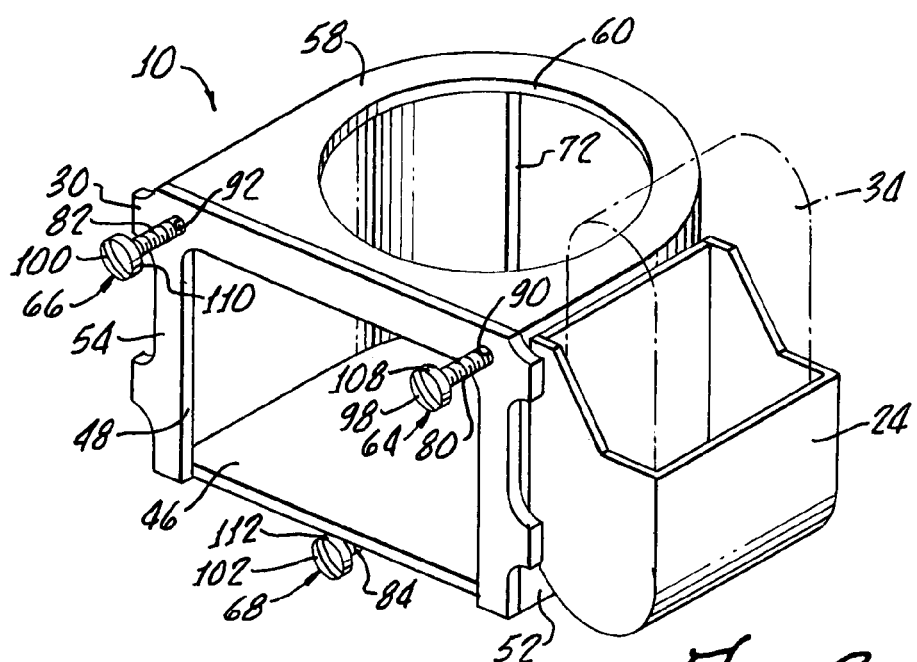
FIG. 2 is a perspective view of the holder in accordance with the present invention for supporting a beverage container against an automobile air conditioner/heater grill generally showing a housing and a plurality of adjustable pins protruding from a housing back.

As more clearly shown in FIG. 2, the holder 10, housing 30 includes a beverage container bottom holding base 46, an open back 48, upstanding sidewalls 52, 54 connecting the base 46 and a top 58 with an opening 60 for receiving the beverage container 12, not shown in FIG. 2.

A plurality of protruding pins 64, 66, 68 extending from the housing back 48 enable abutment of the housing 12 with a non-vertical grill 16 by adjustment of protrusion of the pins 64, 66, 68 as illustrated in FIG. 3. A triangular pattern of the pins 64, 66, 68 provides stability.

The open back 48 and a front opening 72 enable passage of air through the housing 12 and encircling a beverage container 12 as illustrated by the arrows 76 in FIGS. 3 and 4. The housing 30 may be formed from any suitable plastic material and molded with the open back 48 and front opening 72.

Each of the pins 64, 66, 68 include threaded shanks 80, 82, 84 which are received by threaded bores 90, 92, 94 respectively in the housing back 48.

Preferably, each pin 64, 66, 68 includes a non-slip head 98, 100, 102 disposed at a protruding end of each pin 64, 66, 68 respectively. The heads 98, 100, 102 are sized to prevent intrusion into the grill 16 and to stabilize the housing 12 there against.

The housing is stabilized or held against the grill by the elastic member 38 as best illustrated in FIG. 4 in which hooks are provided at ends 116, 118 of the elastic member 38.

As best shown in FIG. 4, the elastic member 38 passes between the housing 35 and the cell phone holder 24 for enabling the cell phone holder to be attached to either side 52, 54 of the housing 30.

As illustrated in FIG. 5, which is a cross sectional view taken along the line 5-5 of FIG. 4, the cell phone holder 24 includes a molded bracket 122 for engaging a sidewall opening 124 which enables the cell phone holder 24 to be detachably received by the housing upstanding sidewalls 52, 54.

Although there has been hereinabove described a specific support for beverage container and cell phone in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A holder for supporting a beverage container against an automobile air conditioner/heater grill, said holder comprising:

a housing having a beverage container bottom holding base, an open top surrounding beverage container sides, an open back and upstanding sidewalls connecting the base and open top, the sidewalls having an open front enabling passage of air therethrough and circulation of air around the container sides;

a plurality of adjustable pins protruding from the housing back, adjustment of protrusion of the pins from the housing back enabling abutment with a non-vertical grill with the housing top in a generally horizontal plane; the plurality of adjustable pins including three adjustable pins spaced apart from one another in a triangular relationship on the housing back;

an elastic member encircling the housing sidewalls and front in a spaced apart relationship with the pins, for holder the pins against the grill;

grill engagement hooks fixed to opposite ends of said elastic member;

a cell phone holder detachably received by the housing upstanding sidewalls; and opposing openings in the housing sidewalls for enabling detachable engagement of the cell phone holder on opposite sides of said housing.

2. The holder according to claim 1 wherein said elastic member passes between said cell phone holder and the housing sidewalls.

3. The holder for supporting a beverage container against an automobile air conditioner/heater grill, said holder comprising:

a housing having a beverage container bottom holding base, an open top surrounding beverage container sides, an open back and upstanding sidewalls connecting the base and open top, the sidewalls having an open front enabling passage of air therethrough and circulation of air around the container sides;

a plurality of adjustable pins protruding from the housing back, adjustment of protrusion of the pins from the housing back enabling abutment with a non-vertical grill with the housing top in a generally horizontal plane; the plurality of adjustable pins including three adjustable pins spaced apart from one another in a triangular relationship on the housing back, each pin including a threaded shank received by corresponding threaded bores disposed in the housing back;

an elastic member encircling the housing sidewalls and front in a spaced apart relationship with the pins, for holder the pins against the grill; and grill engagement hooks fixed to opposite ends of said elastic member;

4. The holder according to claim 3 wherein each pin includes a non-slip head portion disposed at a protruding end of each pin.

* * * * *